(No Model.)
E. C. GERSTENBERGER.
COMPOSITION MATERIAL FOR SHIELDS.
No. 574,728.          Patented Jan. 5, 1897.
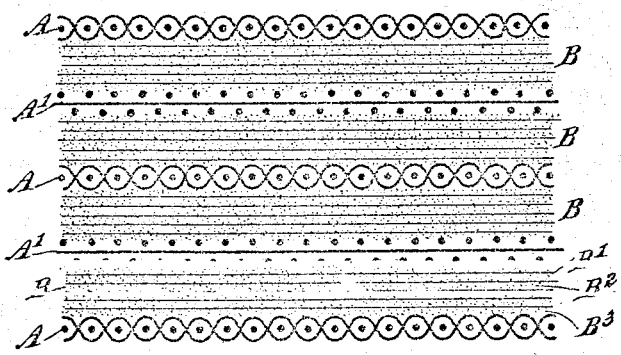
WITNESSES:
INVENTOR
E. C. Gerstenberger
BY Munn & Co
ATTORNEYS.

UNITED STATES PATENT OFFICE.

EDWARD C. GERSTENBERGER, OF BROOKLYN, NEW YORK.

COMPOSITION MATERIAL FOR SHIELDS.

SPECIFICATION forming part of Letters Patent No. 574,728, dated January 5, 1897.

Application filed October 11, 1895. Renewed June 1, 1896. Serial No. 593,920. (No specimens.)

*To all whom it may concern:*

Be it known that I, EDWARD C. GERSTENBERGER, of Brooklyn, in the county of Kings and State of New York, have invented a new and Improved Material for Armor and other Purposes, of which the following is a full, clear, and exact description.

The object of the invention is to provide a new and improved resisting material which is bullet-proof and waterproof, can be readily shaped, cut, and bent into any desired form, and more especially designed for manufacturing armor, covers, and other articles.

The invention consists principally of alternate layers of fabrics, of which one layer consists of haircloth and the other layer comprises sheets of gutta-percha silesia with a minutely-divided substance between the sheets.

The invention also consists of certain parts and details and combinations of the same, as will be fully described hereinafter, and then pointed out in the claims.

Reference is to be had to the accompanying drawing, forming a part of this specification, in which the figure is an enlarged sectional side elevation of the material.

The improved material consists principally of alternate layers of fabrics A, A', and B, of which the alternate layers A A' are made of haircloth with the succeeding layers crosswise to the previous layer, as indicated in the drawing. The layer B consists of sheets B' of gutta-percha silesia, between which is placed a minutely-divided substance B², preferably a mixture of alum and ground glass.

As shown in the drawing, the layer B consists of five sheets of silesia, preferably coated with gutta-percha, and in manufacturing the material I place first a layer A of haircloth, then sprinkle the top thereof with a mixture of alum and ground glass, then place on the top of this substance the prepared layer B, arranged as above described. Then I place on the top of this layer a layer A' of haircloth crosswise relative to the layer A, and then I subject the three layers to heat and pressure, so as to firmly unite the three layers and press the same into a thin sheet. On the top of this sheet is sprinkled another mixture of alum and ground glass, and then a layer B is placed on this substance and another layer A of haircloth, after which heat and pressure is again applied and the operation is repeated, and then as many alternate layers as necessary are placed one upon the other until the desired thickness of the finished material is obtained. It is understood that any desired number of such alternate layers may be united with each other to form a material of the desired thickness, according to the intended use of the finished article. It is understood that when heat is applied the layers A B A' B', &c., are firmly pressed in intimate contact with each other to produce a bullet-proof and waterproof material having a very great resistance.

When the several layers are united as above described, the entire piece may be subjected to a very heavy pressure, so as to insure a complete uniting of the layers and substance and make the material of any desired uniform thickness. It is further understood that other materials instead of alum and ground glass may be used, but I have found by experience that the mixture of alum and ground glass gives excellent results.

It is understood that when the layers of the haircloth and gutta-percha are subjected to the high pressure and heat the gutta-percha, alum, and glass are made sufficiently fluid to pass into and firmly unite with the haircloth, the molten substance readily passing into the meshes of the cloth to form a compact mass of haircloth and gutta-percha, alum, and glass. The haircloth before use is preferably soaked in a solution of alum and water to prevent the hairs from becoming singed or burned when heat and pressure is applied as above described.

A piece of material prepared in this manner is very light and of a great resistance, preventing the penetration of bullets of great force and power. The material is not liable to split and is perfectly waterproof and a non-conductor of heat, electricity, and other matter. Articles too numerous to mention can be manufactured from the material.

Having thus fully described my invention, I claim as new and desire to secure by Letters Patent—

1. A material for armor and the like, consisting of alternate layers of fabrics, of which one layer consists of haircloth and the other layer comprises sheets of silesia with a minutely-divided substance between the sheets, substantially as shown and described.

2. A material for armor and the like, consisting of alternate layers of fabrics, of which one layer consists of haircloth and the other layer comprises sheets of silesia with a minutely-divided substance between the sheets, the said substance being a mixture of alum and ground glass, substantially as shown and described.

3. A material for armor and the like, consisting of alternate layers of fabrics, of which one layer consists of haircloth and the other layer comprises sheets of silesia with a minutely-divided substance between the sheets, the said layers being firmly united with each other by the application of heat and pressure, substantially as shown and described.

4. A material for armor and the like, consisting of alternate layers of fabrics, of which one layer consists of haircloth and the other layer comprises sheets of silesia and a minutely-divided substance between the sheets, the layers of haircloth crossing one upon the other, substantially as shown and described.

EDWARD C. GERSTENBERGER.

Witnesses:
 THEO. G. HOSTER,
 JNO. M. RITTER.